(12) United States Patent
Oh

(10) Patent No.: US 10,916,217 B2
(45) Date of Patent: Feb. 9, 2021

(54) ELECTRONIC DEVICE AND CONTROL METHOD THEREOF

(71) Applicant: SAMSUNG ELECTRONICS CO., LTD., Suwon-si (KR)

(72) Inventor: Sungbo Oh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 25 days.

(21) Appl. No.: 16/370,033

(22) Filed: Mar. 29, 2019

(65) Prior Publication Data

US 2019/0348010 A1 Nov. 14, 2019

(30) Foreign Application Priority Data

May 11, 2018 (KR) .................. 10-2018-0054447

(51) Int. Cl.
*G09G 5/00* (2006.01)
*H04N 21/436* (2011.01)

(52) U.S. Cl.
CPC .......... *G09G 5/006* (2013.01); *H04N 21/436* (2013.01); *G09G 2370/042* (2013.01); *G09G 2370/047* (2013.01); *G09G 2370/12* (2013.01)

(58) Field of Classification Search
CPC . G09G 5/006; G09G 2370/042; H04N 21/436
USPC ......................................................... 710/10
See application file for complete search history.

(56) References Cited

U.S. PATENT DOCUMENTS

| | | | |
|---|---|---|---|
| 8,069,276 B2 | 11/2011 | Kang et al. | |
| 8,736,768 B2 | 5/2014 | Tokoro | |
| 9,575,917 B1 * | 2/2017 | Zhu | G06F 16/40 |
| 2015/0295903 A1 * | 10/2015 | Yi | H04L 9/3263 |
| | | | 713/153 |
| 2016/0086567 A1 | 3/2016 | Suzuki | |
| 2016/0345055 A1 | 11/2016 | Kim | |
| 2016/0365065 A1 | 12/2016 | Wu et al. | |
| 2017/0060804 A1 * | 3/2017 | Chiba | G06F 13/4282 |
| 2017/0092226 A1 | 3/2017 | Park et al. | |

(Continued)

FOREIGN PATENT DOCUMENTS

| | | |
|---|---|---|
| JP | 2009-253468 A | 10/2009 |
| JP | 2016-163238 A | 9/2016 |

(Continued)

OTHER PUBLICATIONS

International Search Report dated Jul. 24, 2019, issued by the International Searching Authority in International Application No. PCT/KR2019/004543 (PCT/ISA/210).

(Continued)

*Primary Examiner* — Idriss N Alrobaye
*Assistant Examiner* — Brooke J Taylor
(74) *Attorney, Agent, or Firm* — Sughrue Mion, PLLC

(57) ABSTRACT

An electronic device includes a memory; a communication interface; and a processor configured to: based on a source device connected through the communication interface being identified to support a version of content transmission encryption, change first Extended Display Identification Data (EDID) information stored in the memory to second EDID information; and change a hot plug detect signal related to the communication interface from a low state to a high state.

20 Claims, 15 Drawing Sheets

(56) References Cited

U.S. PATENT DOCUMENTS

2017/0236489 A1\* 8/2017 Oh ........................ G09G 5/006
348/727
2017/0280184 A1 9/2017 Kozuka et al.

FOREIGN PATENT DOCUMENTS

KR          10-0841434 B1    6/2008
KR     10-2010-0089328 A     8/2010

OTHER PUBLICATIONS

Written Opinion dated Jul. 24, 2019, issued by the International Searching Authority in International Application No. PCT/KR2019/004543 (PCT/ISA/237).

\* cited by examiner

FIG. 2A

| Byte # | 7 | 6 | 5 | 4 | 3 | 2 | 1 | 0 |
|---|---|---|---|---|---|---|---|---|
| 0 | Vendor-specific tag code(=3) | | | | Length(=N) | | | |
| 1 | 24-bit IEEE Registration Identifier (0x000C03) (least significant byte first) | | | | | | | |
| 2 | | | | | | | | |
| 3 | | | | | | | | |
| 4 | A | | | | B | | | |
| 5 | C | | | | D | | | |
| 6 | Supports_AI | DC_48bit | DC_36bit | DC_30bit | DC_Y444 | Rsvd (0) | Rsvd (0) | DVI_Dual |
| 7 | Max_TMDS_Clock | | | | | | | |
| 8 | Latency_Fields_Present | I_Latency_Fields_Present | HDMI_Video_present | Rsvd (0) | CNC3 | CNC2 | CNC1 | CNC0 |
| (9) | Video_Latency | | | | | | | |

FIG. 5

```
e_hdcp_type hdmi_ocm_rx_get_hdcp_type(struct sdp_swi * hdmi_ocm_param, port_select_e port_num)
{
 e_hdcp_type hdcp_type = e_NOHDCP;
 int i2c_err = 0;
 u8 reg_val_1 = 0;
 u8 reg_val_2 = 0;    ~510
 u8 reg_val_3 = 0;
                                                                                    520
 i2c_err = hdmi_ocm_read8(hdmi_ocm_param, REG_OCM_RX_HDCP_STAT(port_num), &reg_val_1);
 i2c_err |= hdmi_ocm_read8(hdmi_ocm_param, REG_OCM_RX_HDCP2X_GEN_STATUS(port_num), &reg_val_2);
 i2c_err |= hdmi_ocm_read8(hdmi_ocm_param, REG_OCM_RX_HDCP2X_AUTH_STAT(port_num), &reg_val_3);

if(
  (reg_val_2 & BIT_MASK_OCM_RX_HDCP2X_GEN_STATUS__RO_HDCP2RX_MODE_SEL) &&
  (reg_val_3 & BIT_MASK_OCM_RX_HDCP2X_AUTH_STAT__AUTH_DONE)
 )
 {
  hdcp_type = e_HDCP22;
 }
 else if(
  (reg_val_1 & BIT_MASK_OCM_RX_HDCP_STAT__HDCP_AUTHENTICATED) &&
  (reg_val_1 & BIT_MASK_OCM_RX_HDCP_STAT__HDCP_DECRYPTING)
 )
 {
  hdcp_type = e_HDCP14;
 }
 else
 {
  hdcp_type = e_NOHDCP;
 } return hdcp_type;
}
```

| Offset (hex) | Name | Size in Bytes | Rd/Wr | Function |
|---|---|---|---|---|
| 0x00 | HDCP1.4 | 68 | Rd/Wr | Reserved for use as specified in HDCP1.4 |
| 0x44 | Rsvd | 12 | Rd | All bytes read as 0x00 |
| 0x50 | HDCP2Version | 1 | Rd | While HPD is asserted, the HDCP Receiver must maintain a valid value for HDCP2Version available for reading by the Transmitter. Bits 7-3 : Reserved (must be zero) Bits 2 : When set to one, this HDCP Receiver supports HDCP2.2. Bits 1-0 : Reserved (must be zero) |
| 0x51 | Rsvd | 15 | Rd | All bytes read as 0x00 |
| 0x60 | Write_Message | 1 | Wr | The HDCP Transmitter performs write of a variable length message to the HDCP Receiver as a single burst write to this address. Note, there is no auto-increment of the I²C offset address. |
| 0x61 | Rsvd | 15 | Rd | All bytes read as 0x00 |
| 0x70 | RxStatus | 2 | Rd | See Table 2.8 for description of bits. Bit 15:12:Reserved (must be zero) Bit 11:REAUTH_REQ Bit 10:READY Bit 9-0:Indicates the size in bytes of the message available at the HDCP Receiver for reading by the HDCP Transmitter. |
| 0x72 | Rsvd | 14 | Rd | All bytes read as 0x00 |
| 0x80 | Read_Message | 1 | Rd | The HDCP Transmitter performs read of a variable length message |

| | | |
|---|---|---|
| InfoFrame Type Code | \multicolumn{2}{c}{InfoFrame Type = $03_{16}$} |
| InfoFrame Version Number | \multicolumn{2}{c}{Version = $01_{16}$} |
| Length of Source Product Description InfoFrame | \multicolumn{2}{c}{Length of Source Product Description InfoFrame = 25} |
| Data Byte 1 | 0 | Vendor Name Character 1 VN1 (7bit ASCII code) |
| Data Byte 2 | 0 | Vendor Name Character 2 VN2 |
| Data Byte 3 | 0 | Vendor Name Character 3 VN3 |
| Data Byte 4 | 0 | Vendor Name Character 4 VN4 |
| Data Byte 5 | 0 | Vendor Name Character 5 VN5 |
| Data Byte 6 | 0 | Vendor Name Character 6 VN6 |
| Data Byte 7 | 0 | Vendor Name Character 7 VN7 |
| Data Byte 8 | 0 | Vendor Name Character 8 VN8 |
| Data Byte 9 | 0 | Product Description Character 1 PD1 (7-bit ASCII code) |
| Data Byte 10 | 0 | Product Description Character 2 PD2 |
| Data Byte 11 | 0 | Product Description Character 3 PD3 |
| Data Byte 12 | 0 | Product Description Character 4 PD4 |
| Data Byte 13 | 0 | Product Description Character 5 PD5 |
| Data Byte 14 | 0 | Product Description Character 6 PD6 |
| Data Byte 15 | 0 | Product Description Character 7 PD7 |
| Data Byte 16 | 0 | Product Description Character 8 PD8 |
| Data Byte 17 | 0 | Product Description Character 9 PD9 |
| Data Byte 18 | 0 | Product Description Character 10 PD10 |
| Data Byte 19 | 0 | Product Description Character 11 PD11 |
| Data Byte 20 | 0 | Product Description Character 12 PD12 |
| Data Byte 21 | 0 | Product Description Character 13 PD13 |
| Data Byte 22 | 0 | Product Description Character 14 PD14 |
| Data Byte 23 | 0 | Product Description Character 15 PD15 |
| Data Byte 24 | 0 | Product Description Character 16 PD16 ~710 |
| Data Byte 25 | \multicolumn{2}{c}{Source Device Information} |

| Data Byte | 1 | 2 | 3 | 4 | 5 | 6 | 7 | 8 | 9 | 10 | 11 | 12 | 13 | 14 | 15 | 16 | ~ | | 25 |
|---|---|---|---|---|---|---|---|---|---|---|---|---|---|---|---|---|---|---|---|
| Character | S | A | M | S | U | N | G | | B | D | - | P | 1 | 6 | 0 | 0 | | | 0Ah |
| | Vendor Name |||||||| Model Name |||||||| | | PRODUCT CATEGORY |

| Code | Source Device Information |
|---|---|
| 00h | unknown |
| 01h | Digital STB |
| 02h | DVD player |
| 03h | D-VHS |
| 04h | HDD Videorecorder |
| 05h | DVC |
| 06h | DSC |
| 07h | Video CD |
| 08h | Game |
| 09h | PC general |
| 0Ah | Blu-Ray Disc (BD) |
| 0Bh | Super Audio CD |
| 0Ch ... FFh- | Reserved |

ELECTRONIC DEVICE AND CONTROL METHOD THEREOF

CROSS-REFERENCE TO RELATED APPLICATIONS

This application is based on and claims priority under 35 U.S.C. § 119 to Korean Patent Application No. 10-2018-0054447, filed on May 11, 2018, in the Korean Intellectual Property Office, the disclosure of which is incorporated by reference herein in its entirety.

BACKGROUND

1. Field

The disclosure relates to an electronic device and a controlling method thereof, and more particularly, to an electronic device capable of performing communication with an external device and a controlling method thereof.

2. Description of Related Art

Beyond a Full High Definition (HD) resolution, contents with a Ultra HD level resolution has increased, and a sync device equipped with an HDMI (High-Definition Multimedia Interface) port supporting HDMI 2.0 version becomes increasingly popular. However, in many cases, a source device (e.g., a DVD player, a set-top box, etc.) used in connection with such a sync device has not yet supported the HDMI 2.0 version.

Accordingly, a recently-launched sync device is implemented such that a user directly confirms the HDMI version supported by the source device and manually sets the HDMI version menu. However, there is a problem that the user must manually set the HDMI version menu.

SUMMARY

In accordance with an aspect of the disclosure, there is provided an electronic device including a memory; a communication interface; and a processor configured to: based on a source device connected through the communication interface being identified to support a version of content transmission encryption, change first Extended Display Identification Data (EDID) information stored in the memory to second EDID information; and change a hot plug detect signal related to the communication interface from a low state to a high state.

The processor may be further configured to: based on the source device being identified to support the version of the content transmission encryption, identify that the source device supports High-Definition Multimedia Interface (HDMI) version corresponding to the second EDID information, and change the first EDID information stored in the memory to the second EDID information, wherein the first EDID information includes Vendor-Specific Data Block (VSDB), and wherein the second EDID information includes Vendor-Specific Data Block (VSDB) and HDMI Forum Vendor-Specific Data Block (HF-VSDB).

The memory may be a first memory accessible by the source device, and wherein the processor may be further configured to, based on the source device being identified to distinguish the VSDB and the HF-VSDB by supporting the HDMI version corresponding to the second EDID information, write the VSDB and the HF-VSDB to the first memory according to information stored in a second memory.

The memory may be a first memory accessible by the source device, and wherein the processor may be further configured to, based on the source device being identified to distinguish the VSDB and the HF-VSDB by supporting the HDMI version corresponding to the second EDID information, additionally write the HF-VSDB to the first memory according to information stored in a second memory.

The VSDB may be stored in a first area of the memory, and wherein the processor may be further configured to, based on the source device being identified to distinguish the VSDB and the HF-VSDB by supporting the HDMI version corresponding to the second EDID information, additionally write the HF-VSDB to the first area of the memory according to information stored in a second area of the memory.

The processor may be further configured to, based on being connected to the source device through the communication interface according to the version of the content transmission encryption via the communication interface, identify that the source device supports the version of the content transmission encryption based on the connection.

The processor may be further configured to, based on there being a communication connection attempt in accordance with the version of the content transmission encryption through the communication interface, identify that the source device supports the version of the content transmission encryption.

The processor may be further configured to: maintain the first EDID information stored in the memory while a predetermined menu is inactivated; based on the predetermined menu being changed to an activation state, change the first EDID information stored in the memory to the second EDID information; and based on the source device being identified to support the version of the content transmission encryption, change the predetermined menu from an inactivation state to the activation state.

The communication interface may be an HDMI port, and the processor may be further configured to change a signal of a predetermined pin related to the hot plug detect signal among a plurality of pins included in the HDMI port from the low state to the high state.

The version of the content transmission encryption of a predetermined version may be High-bandwidth Digital Content Protection (HDCP) 2.2 version or higher.

In accordance with an aspect of the disclosure, there is provided a method for controlling an electronic device, the method including: based on a source device connected through a communication interface being identified to support content transmission encryption, changing first Extended Display Identification Data (EDID) information stored in a memory to second EDID information; and changing a hot plug detect signal related to the communication interface from a low state to a high state.

The changing of the first EDID information to the second EDID information may include: based on the source device being identified to support a version of the content transmission encryption, identifying that the source device supports High-Definition Multimedia Interface (HDMI) version corresponding to the second EDID information, and changing the first EDID information stored in the memory to the second EDID information, wherein the first EDID information includes Vendor-Specific Data Block (VSDB), and wherein the second EDID information includes Vendor-Specific Data Block (VSDB) and HDMI Forum Vendor-Specific Data Block (HF-VSDB).

The memory may be a first memory accessible by the source device, and wherein the changing of the first EDID information to the second EDID information may include, based on the source device being identified to distinguish the VSDB and the HF-VSDB by supporting the HDMI version corresponding to the second EDID information, writing the VSDB and the HF-VSDB to the first memory according to information stored in a second memory.

The memory may be a first memory accessible by the source device, and wherein the changing of the first EDID information to the second EDID information may include, based on the source device being identified to distinguish the VSDB and the HF-VSDB by supporting the HDMI version corresponding to the second EDID information, additionally writing the HF-VSDB to the first memory according to information stored in a second memory.

The method may include, based on being connected to the source device through the communication interface according to the version of the content transmission encryption via the communication interface, identifying that the source device supports the version of the content transmission encryption based on the connection.

The method may include, based on there being a communication connection attempt according to the version of the content transmission encryption through the communication interface, identifying that the source device supports the version of the content transmission encryption.

The changing of the first EDID information to the second EDID information may include, maintaining the first EDID information stored in the memory while a predetermined menu is inactivated; based on the predetermined menu being changed to an activation state, changing the first EDID information stored in the memory to the second EDID information; and based on the source device being identified to support the version of the content transmission encryption, changing the predetermined menu from an inactivation state to the activation state.

The communication interface may be an HDMI port, and wherein the changing of the hot plug detect signal from the low state to the high state may include changing a signal of a predetermined pin related to the hot plug detect signal among a plurality of pins included in the HDMI port from the low state to the high state.

The version of the content transmission encryption of may be High-bandwidth Digital Content Protection (HDCP) 2.2 version or higher.

In accordance with an aspect of the disclosure, there is provided a non-transitory computer readable medium having stored thereon one or more instructions which, when executed by a processor of an electronic device, causes the electronic device to perform operations, the operations including: based on a source device connected through a communication interface being identified to support the version of content transmission encryption, changing first Extended Display Identification Data (EDID) information stored in a memory to second EDID information; and changing a hot plug detect signal related to the communication interface from a low state to a high state.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 2A is a view illustrating a VSDB according to an embodiment;

FIG. 5 is a view illustrating a method for identifying an HDCP version of an external device according to an embodiment;

FIG. 6 is a view illustrating a method for identifying an HDCP version of an external device according to an embodiment;

FIG. 7A is a view illustrating an SPD (Source Product Description) infoframe according to an embodiment;

FIG. 7B is a view illustrating an SPD infoframe according to an embodiment;

FIG. 7C is a view illustrating an SPD infoframe according to an embodiment;

DETAILED DESCRIPTION

Figure 1:
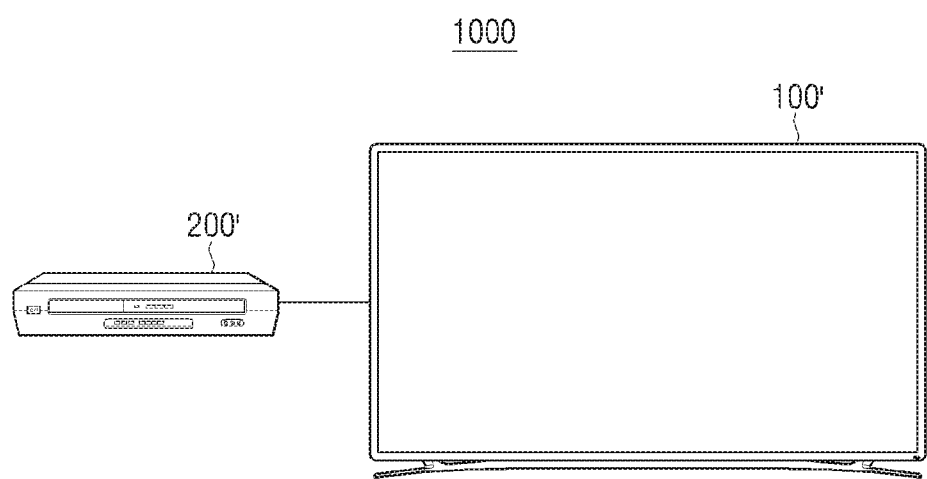
FIG. 1 is a configuration diagram illustrating an electronic system according to an embodiment.

Hereinafter, embodiments will be described in detail with reference to the accompanying drawings.

An aspect of the disclosure relates to providing an electronic device capable of providing EDID information corresponding to HDMI version supported by a source device without manually setting an HDMI version menu by a user, and a controlling method thereof.

According to embodiments, without requiring a user to manually set a menu for converting EDID information related to an HDMI version of TV, an optimal UHD screen or an HDR screen may be viewed with an HDMI cable connected in connection with a source device supporting the HDMI 2.0 version.

The terms used in this specification will be briefly described, and the disclosure will be described in detail.

All the terms used in this specification including technical and scientific terms have the same meanings as would be generally understood by those skilled in the related art. However, these terms may vary depending on the intentions of the person skilled in the art, legal or technical interpretation, and the emergence of new technologies. In addition, some terms are arbitrarily selected by the applicant. These terms may be construed in the meaning defined herein and, unless otherwise specified, may be construed on the basis of the entire contents of this specification and common technical knowledge in the art.

The scope of the disclosure is not limited to embodiments disclosed below and may be implemented in various forms. In addition, all changes or modifications derived from the meaning and scope of the claims and their equivalents should be construed as being included within the scope of the disclosure. In the following description, the configuration which is publicly known but irrelevant to the gist of the disclosure could be omitted.

The terms such as "first," "second," and so on may be used to describe a variety of elements, but the elements should not be limited by these terms. The terms are used simply to distinguish one element from other elements.

The singular expression also includes the plural meaning as long as it does not differently mean in the context. In this specification, terms such as 'include' and 'have/has' should be construed as designating that there are such features, numbers, operations, elements, components or a combination thereof in the specification, not to exclude the existence or possibility of adding one or more of other features, numbers, operations, elements, components or a combination thereof.

In the disclosure, expressions "A or B," "at least one of A and/or B," or "one or more of A and/or B," and the like include all possible combinations of the listed items.

According to an embodiment, 'a module', 'a unit', or 'a part' perform at least one function or operation, and may be realized as hardware, such as a processor or integrated circuit, software that is executed by a processor, or a combination thereof. In addition, a plurality of 'modules', a plurality of 'units', or a plurality of 'parts' may be integrated into at least one module or chip and may be realized as at least one processor except for 'modules', 'units' or 'parts' that should be realized in a specific hardware.

Hereinafter, embodiments will be described in detail with reference to the accompanying drawings so that those skilled in the art can easily carry out the embodiments. However, the disclosure may be embodied in many different forms and is not limited to the embodiments described herein. In order to clearly illustrate the disclosure in the drawings, some of the elements that are not essential to the complete understanding of the disclosure are omitted for clarity, and like reference numerals refer to like elements throughout the specification.

Hereinafter, the disclosure will be describe in greater detailed with reference to drawings.

FIG. 1 is a configuration diagram illustrating an electronic system according to an embodiment.

Referring to FIG. 1, an electronic system 1000 include a sync device 100' and a source device 200'.

The source device 200' may provide the content to the sync device 100'. The source device 200' may be implemented as various types of electronic devices capable of providing contents to the sync device 100' such as a set-top box, a digital versatile disc (DVD) player, a Blu-ray disc player, a personal computer (PC), a game device, etc. The sync device 100' may be embodied as electronic devices (contents output apparatuses) of various types capable of outputting contents received from the source device 100' such as a network television (TV), a smart TV, an Internet TV, a Web TV, an Internet Protocol Television (IPTV), a signage, a PC, etc.

The sync device 100' may be embodied as a device for supporting High-Definition Multimedia Interface (HDMI). Accordingly, the sync device 100' and the source device 200' may include an HDMI port, and perform communication with each other through the port. For example, the sync device 100' and the source device 200' may include an HDMI 2.0 port. The HDMI 2.0 may be a standard optimized for ultra-high resolution or higher environment referred to as 4K or UHD (ultra HD). A maximum bandwidth has been increased up to 18 Gbps, and it becomes possible to transmit smoothly running images at 60 Hz at resolutions up to 4,096×2,160 (2160p). In addition, the HDMI 2.0a standard with high-dynamic-range (HDR) video support capability that improves the contrast and color sensitivity throughout the screen was launched in 2015. According to an embodiment, the HDMI 2.0 standard may be referred to as the HDMI 2.0a standard as well.

The source device 200' may provide a content corresponding to Extended Display Identification Data (EDID) information received from the sync device 100' to the sync device 100'. The EDID information may be a standard for transmitting display information from the sync device 100' (i.e., a display) to the source device 200' (i.e., a host device). The EDID may not defined by an interface signal such as a display data channel (DDC), but may be defined by a data format to allow the host device to read display capacity. The EDID information may include manufacturer name, product's manufacturing year/month, product type, EDID version, product resolution and color coordinates, phosphor or filter type, timing, screen size, luminance, pixel, etc.

According to the HDMI standard, resolution information and color information of the sync device 100' may be stored through Vender Specific Data Block (VSDB), and the source device 200' may read VSDB information and transmit the content corresponding to the VSDB information to the sync device 100'.

For example, referring to FIG. 2A, the VSDB may be partitioned by using IEEE codes, including CEC Physical address information 21, color bit information 22, maximum TMDS frequency information 23, Audio/Video Latency information, etc. The color bit information 22 may mean color information, and the maximum Transition Minimized Differential Signaling (TMDS) frequency information 23 may refer to resolution information. This is because higher maximum TMDS clock frequency, the larger amount of data to be transmitted, and thus high resolution data could be transmitted. The source device 200' may identify which format of signal the sync device 100' can receive and output through VSDB including such information, and transmit a content in the signal format corresponding thereto.

Figure 2B:
FIG. 2B is a view illustrating a VSDB according to an embodiment.

However, in the HDMI 1.4 version, only a single VSDB has been provided. In the HDMI 2.0 version, the VSDB may be maintained and HF (HDMI Forum)-VSDB may be added. An example HF-VSDB (24) is illustrated in FIG. 2B.

When two or more VSDBs exist in the sink device 100' as described above, According to the HDMI standard, the source device 200' identifies IEEE Registration Identifiers (IEEE codes), read the IEEE code distinguishably, and clearly grasp the information.

However, the source device released in the HDMI 1.4 version may be embodied to read the VSDB and then HF-VSDB. This is because the HDMI 1.4 version generally uses only on VSDB to be embodied to identify VSDB only by reading Vendor specific tag code(=3) which indicates the VSDB without needing to check IEEE code. In other words, the HDMI source device may read only the Vendor specific tag code(=3) which is common to both the VSDB and HF-VSDB, and overwrite the HF-VSDB on top of the already read and written VSDB. Accordingly, existing VSDB data may be damaged. For example, the fourth bit of the $6^{th}$ byte of VSDB (FIG. 2A) may be bit information indicating whether a TV supports 30 bit, and on top of this, the HF-VSDB (shown in FIG. 2B) may be overwritten, such that the fourth bit of the sixth byte of the HF-VSDB (i.e. a value of Rsvd(0)) may be stored. As such each bit information of all VSDBs may be replaced with each bit information of the HF-VSDBs in the corresponding positions.

Accordingly, the HDMI source device may identify which function is supported by the sync device connected based on the damaged VSDB information. Accordingly, the source device may recognize the HDMI standard supported by the sync device based on the damaged VSDB information, and therefore output a signal based on incorrect specification information of a TV. This causes problems, for example, sound may not be output, a specific resolution may not be output, or color bit may be incorrectly set to be output. This is because the source device has identified that the sync device connected based on the damaged VSDB information cannot support audio, or cannot support a high resolution since the TMDS maximum frequency is low.

In other words, VSDB and HF-VSDB may use different IEEE codes (for example, IEEE OUI of HF-VSDB is 0xC4, 0x5D, and 0xD8, and IEEE OUI of VSDB is 0x03, 0x0C, and 0x00). The above-described problems arise because the existing HDMI source devices are not designed to distinguishably process the HDMI and the VSDB.

Figure 3:
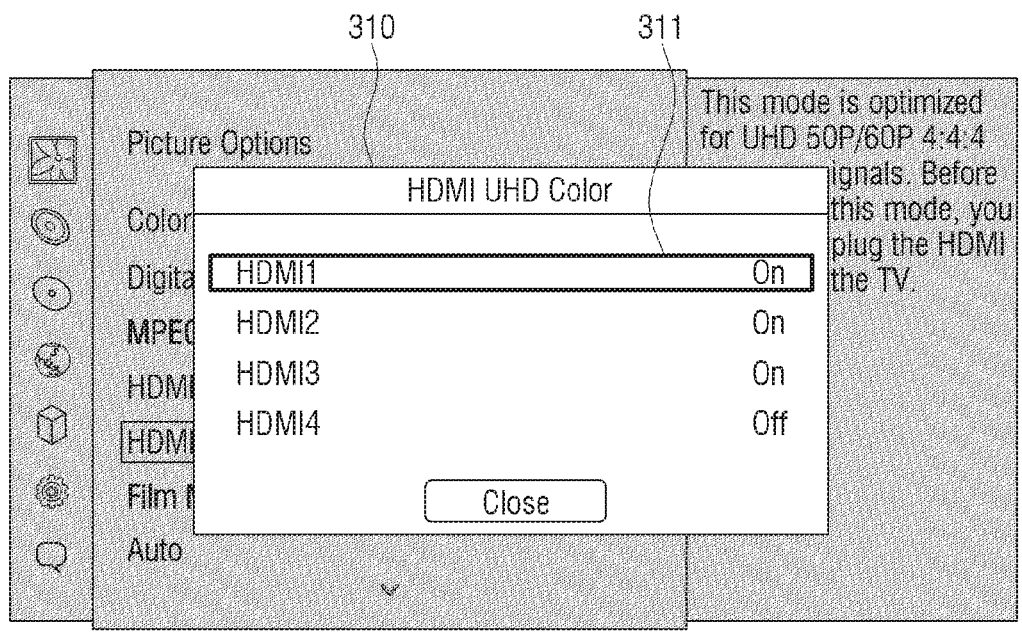
FIG. 3 is a view illustrating an HDMI version menu according to an embodiment.

For compatibility with the source device released in the HDMI 1.4 version, the recently launched HDMI sync device may basically store only the VSDB in a memory accessed by the HDMI sync device, and when the HDMI source device for identifying the VSDB and the HF-VSDB is connected, may store both of the VSDB and the HF-VSDB in the memory through the HDMI version menu. For example, as shown in FIG. 3, the HDMI sync device may be embodied to set ON or OFF 311 for each HDMI port of the HDMI UHD color in a menu 310 related to settings.

According to an embodiment, when the HDMI UHD Color is OFF, only the VSDB may be stored in the memory. In this case, the source device may recognize that the sync device is available for supporting the maximum resolution: 2160p 4:2:0, maximum color bit: 8 bit, and color gamut: BT.709 color format based on the VSDB. That is, even if the sync device supports the highest resolution: 4K 4:4:4, the highest color bit: 2 bit, and the color gamut: BT.2020, a high-quality signal format may not be transmitted simply because the menu setting is set to be OFF.

Typically, the HDMI sync device may be released with the menu disabled, and embodied to allow a user manually set whether to enable the menu, that is, ON/OFF according to the specification of the HDMI source device. Accordingly, even if a source device and a sync device supporting HDMI 2.0 version are connected to each other, a user cannot watch a high quality image if not setting the menu to ON.

However, according to an embodiment, when a source device supporting the HDMI 2.0 version, i.e., an HDMI source device capable of distinguishing the VSDB and the HF-VSDB, it is possible to change and provide EDID information automatically even if the menu is manually set.

Figure 4:
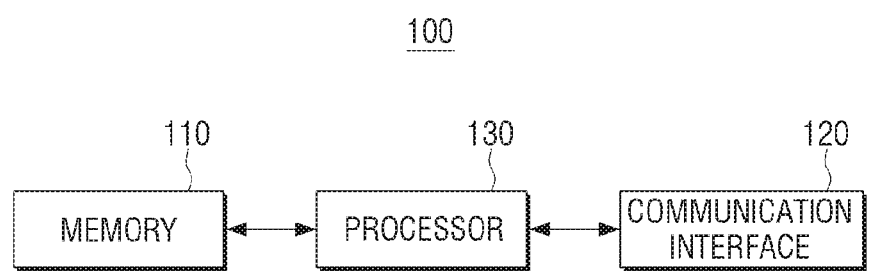
FIG. 4 is a block diagram illustrating configuration of an electronic device according to an embodiment.

FIG. 4 is a block diagram illustrating configuration of an electronic device according to an embodiment.

Referring to FIG. 4, an electronic device 100 may include a memory 110, a communication interface 120, and a processor 130. The electronic device 100 may be embodied as a sync device 100' shown in FIG. 1. According to an embodiment, the electronic device 100 may be provided with a display and output contents directly. Alternatively, if a display is separately provided, the electronic device 100 may reproduce contents and provide the contents to the display.

The memory 110 may store first EDID information, i.e., Extended Display Identification Data (EDID) information of the first HDMI version. For example, the EDID information of the first HDMI version may include a Vendor-Specific Data Block (VSDB) defined in the HDMI specification.

For example, the memory 110 may be embodied as at least one of a flash memory, a ROM, a RAM, a hard disk type, a multimedia card micro type, or a card type memory (e.g., SD or XD memory, etc.).

According to an embodiment, the memory 110 may include a first memory and a second memory.

The first memory may be embodied as a memory that stores the EDID information of the first HDMI version, is readable and writable, and is accessible by an external source device (e.g., the source device 200' of FIG. 1). For example, the EDID information of the first HDMI version may include the Vendor-Specific Data Block (VSDB) defined in the HDMI specification.

For example, the first memory may be implemented with a ROM (e.g., electrically erasable programmable read-only memory (EEPROM)), but is not limited thereto.

The second memory may store the second EDID information, i.e. the EDID information of the second HDMI version. For example, the EDID information of the second HDMI version may include Vendor-Specific Data Block (VSDB) and HDMI Forum (HF)-VSDB defined in the HDMI specification.

However, in some cases, the second memory may store only the HDMI Forum (HF)-VSDB. For example, the second memory may be embodied with a flash memory, but is not limited thereto.

According to another embodiment, the first EDID information may be stored in the first area of one original chip memory 110, and the second EDID information may be stored in the second area. In this case, the first area may be a memory area accessible by the external source device (e.g., the source device 200' in FIG. 1). The second EDID information stored in the second area may include the VSDB and the HF-VSDB, but it is also possible to store only the HDMI Forum (HF)-VSDB in some cases.

The communication interface 120 may perform communication with an external device. The external device may be embodied as the source device 200' shown in FIG. 1. For ease of explanation, it is assumed that the external device is embodied as the source device 200' shown in FIG. 1.

The communication interface 120 may be implemented as an HDMI port capable of receiving high-resolution video and multi-channel digital audio from the external device 200' over a single cable. Specifically, the communication interface 120 may include a Transition Minimized Differential Signaling (TMDS) channel, which receives video and audio signals, a Display Data Channel (DDC) to receive device information, or information related to video, or audio (e.g., Enhanced Extended Display Identification Data (E-EDID)) from connected the external device 200', and a Consumer Electronic Control (CEC) for transmitting a control signal to the external device 200'.

The communication interface 120 may be embodied as an HDMI input port which supports the HDMI standard. The HDMI port of each version may have sub-compatibility. Therefore, it is possible to connect a source device in a high-level standard to an output device in a low-level standard for use, or vice versa. For example, even if the electronic device 100 (e.g., a TV) supports the function related to the HDMI 2.0, if the external device 200' (e.g., a Blue-ray player) supports the function related to the HDMI 1.4, admittedly, only the function related to HDMI 1.4 can be used.

The processor 130 may control the overall operation of the electronic device 100. The processor 130 may function to control the overall operation of the electronic device 100. The processor 130 may include one or more of a central processing unit (CPU), a controller, an application processor (AP), a communication processor (CP), or an APM processor.

The processor 130, when the source device 200' is identified to support content transmission encryption of a predetermined version, may change (or convert) the first EDID information stored in the memory 110 to the second EDID information, and change a hot plug detect signal related to the communication interface 120 from a low state to a high state.

The memory 110 may be implemented with the first memory as described above, wherein the first EDID information includes the VSDB, and the second EDID information includes the VSDB and the HF-VSDB. The content transmission encryption of the predetermined version may be the HDCP of version 2.2 (High-bandwidth Digital Content Protection) (hereinafter referred to as HDCP 2.2) or higher, but is not limited thereto.

Specifically, when the source device 200' is identified as supporting the HDCP version 2.2 or higher, the processor 130 may identify that the source device 200' supports an HDMI corresponding to the second EDID information for following reason. Supporting the HDMI standard corresponding to the second EDID information means that the VSDB and the HF-VSDB can be processed separately, and for ease of explanation, it will be explained that the source device 200' supports the HDMI 2.0 standard.

An HDCP 2.2 version or higher may be supported from the HDMI 2.0 standard, and in a case of source device for replaying UHD contents, most of devices may support the HDCP 2.2 version or higher. This is because HDC P2.2 must be supported in order to output UHD contents in UHD resolution (e.g., 3840×2160p) according to the UHD contents protection standard (AACS 2.0, Advanced Access Content System 2.0). Based on such the standard, a source device (e.g., a UHD BD Player) that plays the UHD content may basically support the HDCP 2.2 version or higher, and thus it is possible to identify whether the source device supports HDMI 2.0 or not based on whether the HDCP 2.2 version or higher is supported.

According to an embodiment, when a sync device is connected to the source device 200' via communication based on the content transmission encryption of a predetermined version through the communication interface 120, it may be identified that the source device 200' supports the content transmission encryption of the predetermined version based on the connection.

When the sync device is connected to the source device 200' by communication based on the HDCP 2.2 version or higher, the processor 130 may identify that the source device 200' supports the HDMI 2.0 or higher, that is, distinguishably process the VSDB and the HF-VSDB.

Specifically, the processor 130 may identify that the source device 200' as a device supporting the HDCP 2.2 version or higher based on the connection of the communication based on the HDCP 2.2 version or higher, and a device supporting the function provided by the HDMI version of HDMI 2.0 or higher since it supports the HDCP version of HDCP 2.2 or higher.

FIG. 5 is a view illustrating a method for identifying an HDCP version of an external device according to an embodiment.

FIG. 5 shows a source code of an electronic device 100 used for identifying an HDCP version of a source device.

The HDCP version of the source device 200' may be identified based on the three register states of the HDMI receiver block from the code shown in FIG. 5.

The three registers of the HDMI receiver block may have a state ranging from an initial value 510 to a different value 520 according to the HDCP version of the source device 200' as shown in FIG. 5.

In FIG. 5, the register associated with the HDCP 1.4 may be REG_OCM_RX_HDCP_STAT [0x3A2] and it can be identified whether the source device is connected of the HDCP 1.4 version based on the register value. For example, if the value of REG_OCM_RX_HDCP_STAT [0x3A2] is "1", it can be identified as being connected in the HDCP 1.4 version.

In FIG. 5, the registers associated with the HDCP 2.2 may be REG_OCM_RX_HDCP2X_GEN_STATUS [0xF0E] and REG_OCM_RX_HDCP2X_AUTH_STAT [0xF0E], and it can be identified whether the source device is connected in the HDCP 2.2 version based on the two retriever values. For example, if both the values of REG_OCM_RX_HDCP2X_GEN_STATUS [0xF0E] and REG_OCM_RX_HDCP2X_AUTH_STAT [0xF0E] are "1", it can be identified as being connected in the HDCP 2.2 version.

Neither of the two cases, the HDCP may be identified as not being activated. However, in some cases, it is also possible to identify the HDCP version based on whether the source device is connected in the HDCP version 2.2 or higher. Unless the source device is not connected in the HDCP version 2.2 or higher, it can be identified as being connected in the HDCP version 1.4 or lower.

As described above, according to an embodiment, the processor 130, when it is identified that the sync device is connected to the source device 200' in the HDCP 2.2 version or higher, may identify that the source device 200' is a device that supports a function in the HDCP version of the HDMI 2.0 or higher.

According to another embodiment, the processor 130, when detecting an attempt for connecting in the HDCP 2.2 version or higher in the source device 200', may identify the source device 200' as a device supporting a function in the HDMI 2.0 version or higher.

Specifically, according to the HDCP specification, a source device that supports the HDCP 2.2 version or higher first confirms whether the connected sync device supports the HDCP version 2.0 or higher in order to connect HDCP communication. This is because only if the sync device is identified as supporting the HDCP 2.2 version or higher, the HDCP communication can be tried to fit with the HDCP version specification of HDCP 2.2 or higher.

FIG. 6 is a view illustrating a method 600 for identifying an HDCP version of an external device according to an embodiment. The source device that supports the HDCP 2.2 version or higher may read a predetermined address of the sync device, for example, address 0x50 shown at element 610 in FIG. 6 in order to identify whether the connected device is a sync device for supporting the HDCP 2.2 version or higher. The address 0x50 defined in the HDCP2.2 specification may be the address which stores a value that enables the source device supporting for the HDCP 2.2 version to identify whether or not the sync device supports the HDCP 2.2 version (whether the HDCP 2.2 version is available).

In other words, when the source device attempts to read address 0x50, it may mean that the source device supports HDCP2.2. HDCP version. In a case of HDCP version 1.4 or lower prior to HDCP2.2, the source device may not read the address 0x50 and there is no reason to read the address 0x50 since the address 0x50 is not defined in the sync device. That is, the operation of reading the address 0x50 after the detection of the hot plug detect signal has not been defined in the HDCP 1.4 or lower version specification. Thus, reading the address 0x50 may mean that the source device that supports HDCP version 2.2 or higher has performed an operation to check whether a sync device supporting HDCP version 2.2 or higher is connected according to the HDCP version specification of HDCP version 2.2 or higher.

According to another embodiment, the processor 130 may identify whether the source device 200' is a device for supporting a function provided in the HDMI 2.0 version or higher based on the information transmitted from the source device 200'. The information transmitted from the source device 200' may be, for example, SPD infoframe information.

FIG. 7A is a view illustrating an SPD infoframe (700) according to an embodiment. The Source Product Description infoframe (SPD infoframe) may be information of a format as shown in FIG. 7A, and be defined in the HDMI specification as information on a source device transmitted from a source device to a sync device. The SPD infoframe may consist of 25 bytes to provide detailed information (710) of the source device to the sync device.

The SPD infoframe may be described in CTA-861G included in the HDMI specification. For example, the information may include information such as a vendor name of a product, a product name describing the product, and a type of source device. FIG. 7B shows an example of the SPD infoframe (720), and FIG. 7C shows an example of the information included in the 25th byte (730).

The processor 130 may identify whether the source device supports the HDMI version of HDMI 1.4 or lower and the HDMI version of HDMI 2.0 or higher based on at least one of model name, manufacturer information, and device type information included in the SPD infoframe.

Specifically, the processor 130 may identify whether the source device identified by the SPD infoframe supports HDMI versions of HDMI 1.4 or lower or HDMI2.0 or higher based on at least one of database prepared in the electronic device 100 and information received from a server. For example, a list including device model names that support HDMI versions of HDMI 1.4 or lower and device model names that support HDMI versions of HDMI 2.0 or higher may be stored in the database, or the list information may be received from the server.

The processor 130 may compare the model name included in the SPD infoframe with the corresponding list to identify whether the source device supports HDMI versions of HDMI 1.4 or lower or HDMI2.0 or higher. However, in some cases, if only a list of device model names that support HDMI version 1.4 or lower (or a list of device model names that support HDMI version 2.0 or higher) is stored and if the source device is not included in the list, it may be identified as a device that supports HDMI version of HDMI 2.0 or higher (or a device that supports HDMI version of HDMI 1.4 or lower). Alternatively, the processor 130 may transmit information on the source device (e.g., a model name) to the server and receive the HDMI version information corresponding to the source device from the server.

When the list is stored in the database (e.g., the memory 110) provided in the electronic device 100, the list may be continuously updated through a network. For example, a model name of a source device manufactured by each manufacturer may be generated with certain rules, information can be managed to confirm the HDMI version only with a model name by updating the database based on the rules and applying module name generation rules.

If the source device 200' is identified as supporting the HDMI version corresponding to the second EDID information, for example, the HDMI version 2.0 or higher, as described above, the processor 130 may write VSDB and HF-VSDB to the memory 110. That is, if it is identified that the source device 200' supports the HDMI standard corresponding to the second EDID information and the VSDB and the HF-VSDB can be distinguished, the processor 130 may write the VSDB and the HF-VSDB to the memory 110.

In one example, the processor 130 may additionally write the HF-VSDB to the first memory (or one area of the memory 110) where the VSDB is pre-stored. As another example, the VSDB and the HF-VSDB may be overwritten in the first memory (or one area of the memory 110) where the VSDB is pre-stored. As another example, the VSDB previously stored in the first memory (or one area of the memory 110) may be deleted, and the VSDB and the HF-VSDB may be newly written.

However, as mentioned above, the sync devices that have been released in the past may identify that the source device supports the HDMI version of HDMI 2.0 or higher when the specific menu, that is, the HDMI UHD Color menu is set to ON, and change EDID information. Accordingly, according to an embodiment, when the source device 200' is identified as supporting HDMI 2.0 for compatibility with the existing sync device, the processor 130 may sets the HDMI UHD Color menu to ON. In this case, when the HDMI UHD Color menu is set to ON, the processor 130 may additionally write the HF-VSDB in the first memory. That is, according to an embodiment, if the source device 200' is identified as supporting HDMI version 2.0 or higher, by setting the HDMI UHD Color menu to ON, the operation afterwards may be embodied to perform according to an operation algorithm of a sync device.

The processor 130 may additionally write the HF-VSDB to the first memory, and transitions a hot plug detect signal from low to high so that the source device 200' may read the changed EDID information.

The hot plug detect signal may be a signal standard for identifying whether the HDMI cable is connected or released according to the HDMI standard. When the electronic device 100 is connected to the source device 200' through the HDMI cable, a voltage sensed through a specific pin of the HDMI port, that is, a hot plug detect signal, may be transitioned from 0V to a predetermined voltage, for example, 5V. In this case, the source device 200' may recognize that the HDMI cable is connected and read the EDID information of the sync device. Accordingly, if the processor 130 randomly transitions the hot plug detect signal from the low state to the high state, it has the same effect as the operation in which the HDMI cable is disconnected and then connected.

For example, the 18th and 19th pins among the 19 pins constituting the HDMI port may perform functions related to the hot plug detect signal. For example, the 18th and 19th pins of the HDMI port provided in the electronic device 100 may be connected through a switch or implemented in a configuration having the same effect. In this case, when a voltage of +5 V is applied through the pin 18 of the HDMI port provided in the source device 200', if both HDMI ports are connected through the HDMI cable, +5V voltage may be detected at the $19^{th}$ pin of the HDMI port provided in the source device 200'. In this case, the source device 200' may recognize that the source device 200' is connected through the HDMI cable and read the EDID information of the electronic device 100.

The processor 130, when the EDID information of the memory 110 is updated, may change a switch that connects the $18^{th}$ and $19^{th}$ pins of the HDMI port provided in the electronic device 100 to OFF, and then to ON, and transmit a hot plug detect signal of +5V to the source device 200'. The source device 200' may sense the hot plug detect signal and read the EDID information updated in the memory 110. The source device 200') may sense V signal, identify that a new sync device is connected, read and renew the EDID information, and set outputting based on the renewed EDID information. According to such output setting, the source device 200' may output an image signal in an HDMI image output signal format optimized to the function of the electronic device 100.

The processor 130 may generate a hot plug detect signal and output the signal through a specific pin of the HDMI port.

Figure 8A:
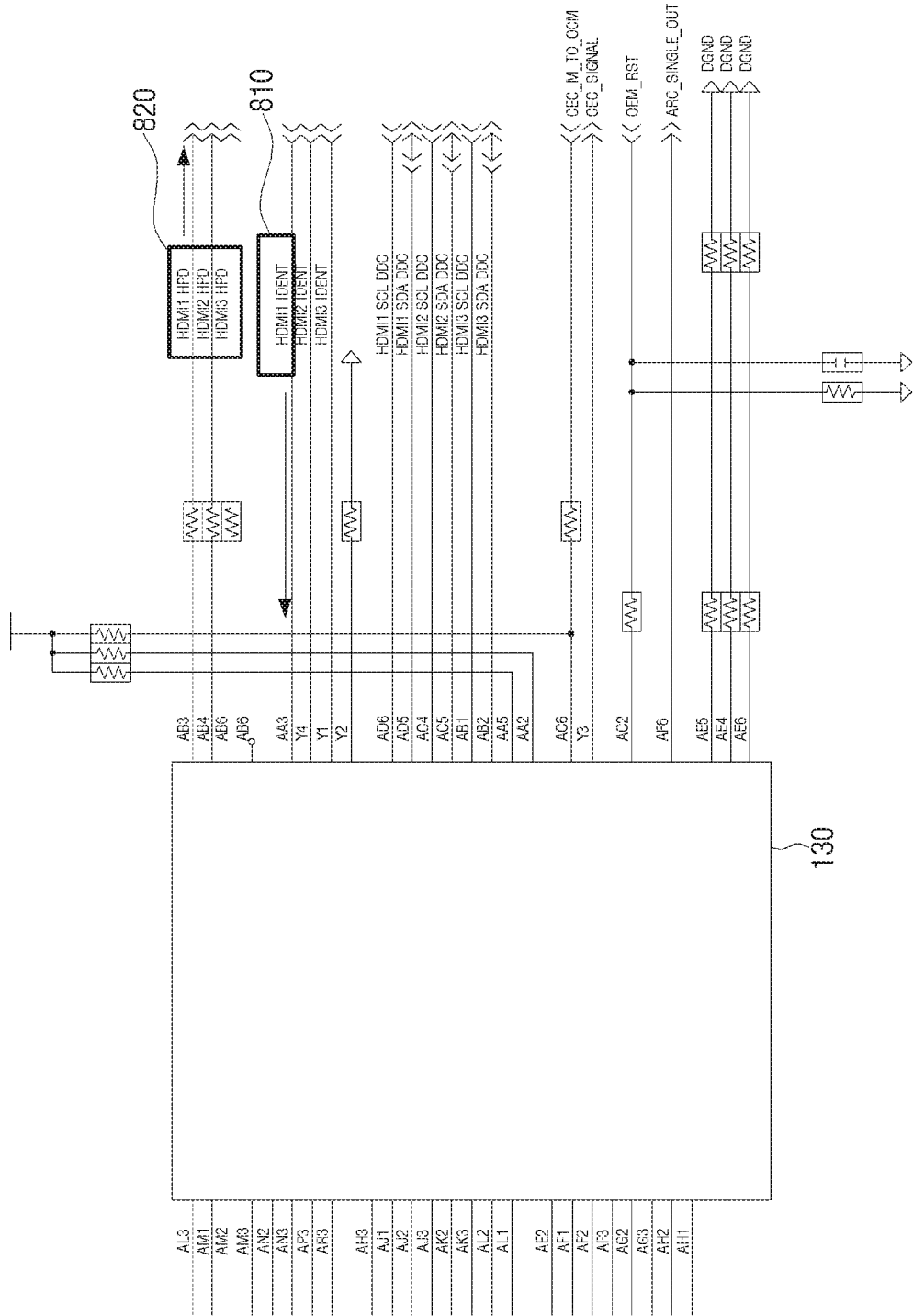
FIG. 8A is a view illustrating a hot plug detect signal according to an embodiment.
Figure 8B:
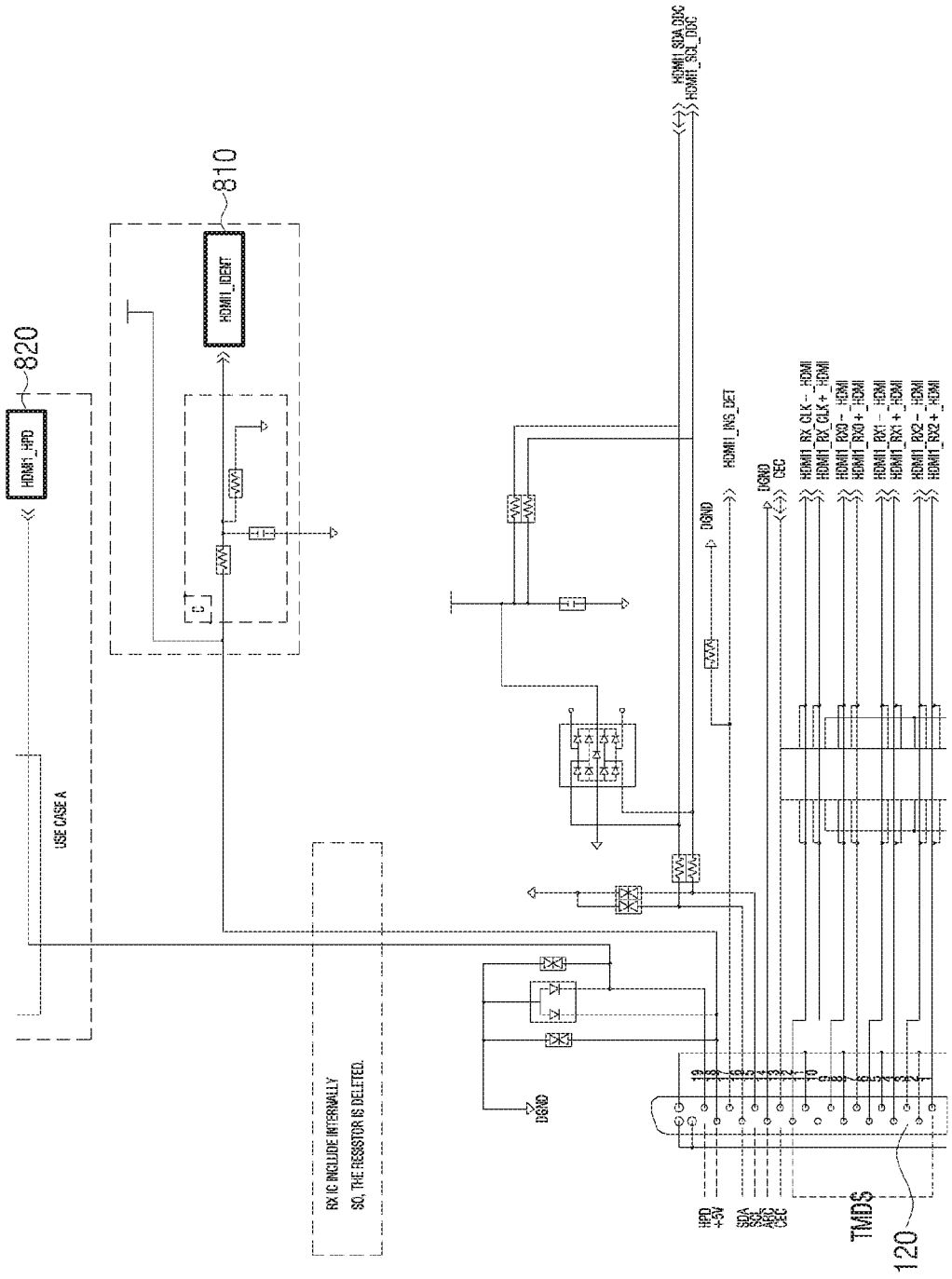
FIG. 8B is a view illustrating a hot plug d detect signal according to an embodiment.

FIG. 8A and FIG. 8B are views illustrating a hot plug detect signal according to an embodiment.

FIG. 8A shows a relationship between a signal 810 input through an HDMI port 120 and a hot plug detect signal 820 output based therefrom.

According to an embodiment, as shown in FIG. 8A, the signal 810 input through the 18th pin of the HDMI port 120 may be controlled by a hot plug detect signal through the processor shown in FIG. 8B, and the hot plug detect signal may be output through the 19th pin of the HDMI port 120 as shown in FIG. 8A.

The processor 130 may output the hot plug detect signal regardless of the signal 810 input through the 18th pin of the HDMI port 120. In this case, the processor 130 may output the hot plug detect signal through the 19th pin of the HDMI port 120.

Figure 9:
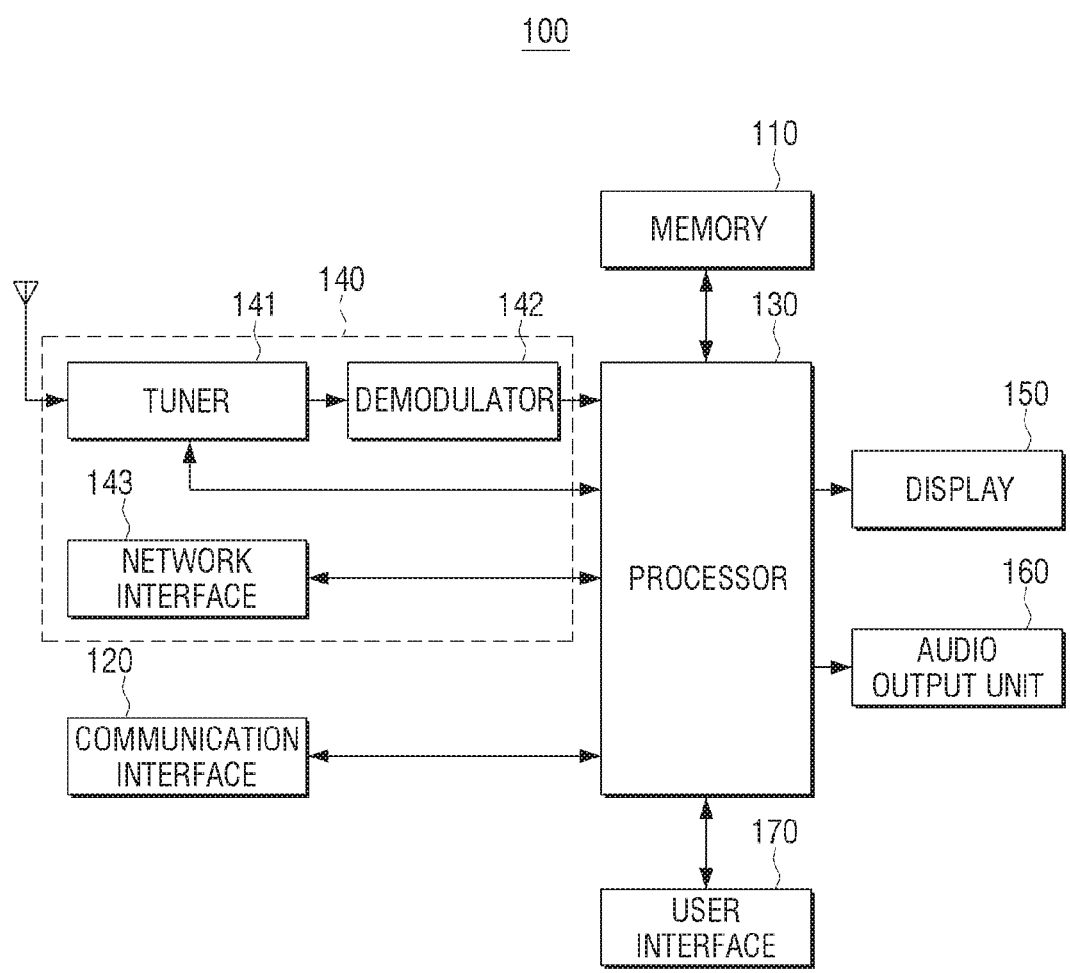
FIG. 9 is a block diagram illustrating detailed configuration of an electronic device shown in FIG. 4 according to an embodiment.

FIG. 9 is a block diagram illustrating detailed configuration of an electronic device shown in FIG. 4.

Referring to FIG. 9, an electronic device 100 may include a memory 110, a communication interface 120, a processor 130, a receiver 140, a display 150, an audio output unit 160, and a user interface 170. The detailed description of configurations of FIG. 3, which has been already described in FIG. 2, will be omitted.

The communication interface 120 may further include various wired/wireless interfaces that can be connected to an external device in addition to the HDMI port described above. For example, the communication interface 120 may include a wired interface such as a USB terminal, a Composite Video Banking Sync (CVBS) terminal, a component terminal, an S-video terminal (analog) and a DVI (Digital Visual Interface) terminal, and a wireless interface that uses a communication protocol such as Wireless LAN (WLAN), Wireless Fidelity (Wi-Fi) Direct, Bluetooth, Radio Frequency Identification (FID), infrared data association (IrDA), UltraWideband (UWB), ZigBee, Digital Living Network Alliance (DLNA), etc.

The memory 110 may store a program for processing and controlling each signal in the processor 130, and store the signal processed image, voice or data signal. The memory 110 may temporarily store images, voices or data signals input from the communication interface 120 or the network interface 143.

The receiver 140 may include at least one of a tuner 141, a demodulator 142, and a network interface 143. In some cases, the receiver 140 may include the tuner 141 and the demodulator 142, but may not include the network interface 143, or vice versa. The tuner 141 may receive an RF signal by tuning a channel selected by a user or pre-stored all channels among Radio Frequency (RF) broadcasting signals received through antenna. The demodulator 142 may receive and demodulate a digital IF signal (DIF) converted in the tuner 141, and perform channel demodulation.

The network interface 143 may provide an interface for connecting the electronic device 100 to a wired/wireless network including the Internet network. The network interface unit 143 may include an Ethernet terminal or the like for connection to a wired network and may use, for example, a Wireless LAN (WLAN) (Wi-Fi), Wireless broadband (Wibro), World Interoperability for Microwave Access (Wimax), and High Speed Downlink Packet Access (HSDPA) communication standards for connection with a wireless network.

The display 150 convert the image signal, the data signal, and the OSD signal processed by the processor 130, or the image signal, the data signal, etc. received at the external interface 120 into R, G, and B signals, respectively to generate driving signals. The display 150 may be implemented as a PDP, an LCD, an OLED, a flexible display, a 3D display, a touch screen, or the like.

The audio output unit 160 may receive the signal voice processed by the processor 130, for example, a stereo signal, a 3.1 channel signal, or a 5.1 channel signal and output the signal as a voice. The audio output unit 160 may be embodied as various forms of speakers.

The user interface 170 may transit the command input by a user to the processor 130, or transmit the signal of the processor 130 to the user. For example, the user interface 170 may be embodied to perform communication with a remote control device according to various communication methods such as an RF communication method, an infrared (IR) communication method, but also could be embodied as a key panel provided in the electronic device 100.

Figure 10:
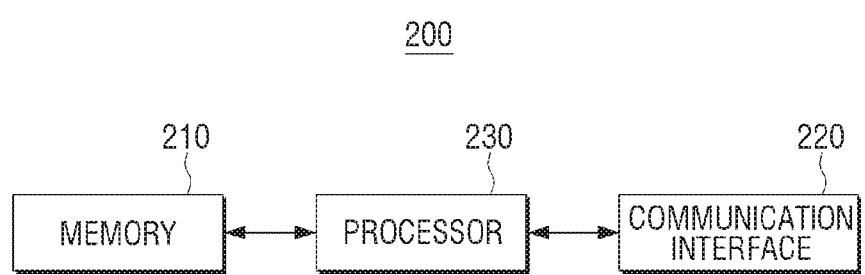
FIG. 10 is a block diagram illustrating configuration of a source device according to an embodiment.

FIG. 10 is a block diagram illustrating configuration of a source device according to an embodiment.

Referring to FIG. 10, a source device 200 may include a memory 210, a communication interface 220 and a processor 230. The source device 200 may be embodied as a source device 200' shown in FIG. 1.

The memory 210 may temporarily or permanently store the information received from the electronic device 100. The memory 210 may be embodied in the similar manner as the memory 110 shown in FIG. 3.

The communication interface 220 may perform communication with the electronic device 100. The electronic device 100 may be embodied as a sync device 100' shown in FIG. 1.

The communication interface 220 may be embodied as an HDMI port in the same manner as the interface 110 shown in FIG. 3. The communication interface 220 may be embodied in the similar manner as the communication interface 110 shown in FIG. 9.

The processor 230, when a hot plug detect signal related to the communication interface 220 is changed from a low state to a high state, may read EDID information stored in the memory 110 of the electronic device 100. The processor 120 may transmit an image signal to the electronic device 100 in an output format corresponding to the EDID information read through the communication interface 220.

According to an embodiment, the processor 230 may sense a hot plug detect signal twice. To be specific, when the source device 200 is connected to the electronic device 100 through the communication interface 120, the processor 230 may sense a hot plug signal that transitions from low to high, and read VSDB stored in the memory 110 of the electronic device 100. Basically, only the VSDB may be stored in the memory 110 (the first memory) of the electronic device 100 accessed by the source device 200. Thereafter, if the electronic device 100 determines that the source device 200 supports HDMI 2.0 according to embodiments, the HF- VSDB may be additionally written to the memory 110 and the hot plug detect signal may be re- The processor 230 switches to the low state and then transitions to the high state, so that the processor 230 senses a second hot-plus signal that transitions from low to high. Accordingly, the processor 230 reads the written VSDB and the HF-VSDB in the memory 110, and transmits the video signal to the electronic device 100 in an output format corresponding to the read information.

Figure 11:
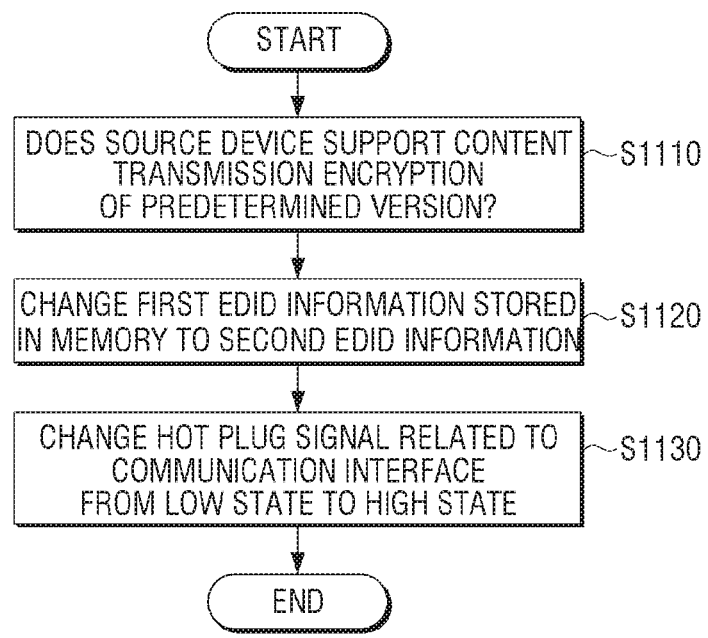
FIG. 11 is a flowchart illustrating a method for controlling an electronic device according to an embodiment.

FIG. 11 is a flowchart illustrating a method for controlling an electronic device according to an embodiment.

According to a controlling method of an electronic device shown in FIG. 11, it may be identified whether a source device connected through a communication interface supports content transmission encryption of a predetermined version at step S1110.

At step S1110, if it is identified that the source device supports the content transmission encryption of the predetermined version, first EDID information stored in a memory may be changed to second EDID information at step S1120.

The hot plug detect signal related to the communication interface may be changed from a low state to a high state at step S1130.

Also, at step S1120, if it is identified that the source device supports the predetermined version of content transmission encryption, the source device may be identified as supporting the High-Definition Multimedia Interface (HDMI) version corresponding to the second EDID information, and the first EDID information stored in the memory may be changed to the second EDID information. The first EDID information may include a Vendor-Specific Data Block (VSDB), and the second EDID information may include a Vendor-Specific Data Block (VSDB) and an HDMI Forum (HF)-VSDB.

The memory may be a first memory accessed by the source device.

At step S1120, if it is identified that the source device supports the HDMI version corresponding to the second EDID information, and the VSDB and the HF-VSDB can be distinguished from each other, the VSDB and the HF-VSDB can be written to the first memory based on the information stored in the second memory.

At step S1120, if it is identified that the source device supports the HDMI version corresponding to the second EDID information, and the VSDB and the HF-VSDB can be distinguished from each other, the HF-VSDB may be additionally written to the first memory based on the information stored in the second memory.

At step S1120, if it is identified that the source device supports the HDMI version corresponding to the second EDID information, and the VSDB and the HF-VSDB can be distinguished from each other, the VSDB and the HF-VSDB may be written in the first area of the memory 110 based on the information stored in the second area of the memory 110.

At step S1120, if it is identified that the source device supports the HDMI version corresponding to the second EDID information, and the VSDB and the HF-VSDB can be distinguished from each other, the HF-VSDB can additionally be written in the first area of the memory 110 based on the information stored in the second area of the memory 110.

At step S1110, when connected to a source device through a communication interface via communication based on content transmission encryption of the predetermined version, the source device may be identified to support the content transmission encryption of the predetermined version.

In addition, at step S1110, based on there being communication connection try based on the content transmission encryption of the predetermined version through the communication interface, it may be identified that the source device support the content transmission encryption of the predetermined version.

At step S1120, the first EDID information stored in the memory may be maintained while a predetermined menu is inactivated, and when the menu is in an activated state, the first EDID information stored in the memory may be changed to second EDID information, and if it is identified that the source device supports the content transmission encryption, the predetermined menu may be changed from the inactivated state to the activated state.

The communication interface may be the HDMI port. At step S1130, a signal of a predetermined pint related to a hot plug direct signal among a plurality of pins included in the HDMI port may be changed from a low state to a high state.

Here, the predetermined version of the content transmission encryption may be 2.2 version or higher HDCP (High-bandwidth Digital Content Protection).

According to embodiments as described above, without requiring a user to manually set a menu for converting EDID information related to an HDMI version of TV, an optimal UHD screen or an HDR screen may be viewed with an HDMI cable connected in connection with a source device supporting the HDMI 2.0 version.

The methods according to embodiments may be embodied as application forms that can be mounted on an electronic device.

The methods according to embodiments may be embodied only with software updated, or hardware upgrade with respect to an electronic device.

The embodiments may be performed by an embedded server provided in an electronic device or an external server provided in the electronic device.

The embodiments described above may be implemented in a recording medium that can be read by a computer or a similar device using software, hardware, or a combination thereof. In some cases, embodiments described herein may be implemented by a processor (130) itself. According to software implementation, embodiments such as the procedures and functions described herein may be implemented in separate software modules. Each of the software modules may perform one or more of the functions and operations described herein.

Meanwhile, computer instructions for performing the processing operations of the electronic device 100 according to embodiments described above may be stored in a non-transitory computer-readable medium. The computer instructions stored in the non-volatile computer-readable medium cause a specific apparatus to perform the processing operations in the electronic device 100 according to embodiments described above when executed by the processor of the specific apparatus.

The non-transitory computer readable medium refers to a medium that stores data semi-permanently rather than storing data for a very short time, such as a register, a cache, and a memory, and is readable by an apparatus. Specifically, the above-described various applications or programs may be stored in a non-transitory computer readable medium such as a compact disc (CD), a digital versatile disk (DVD), a hard disk, a Blu-ray disk, a universal serial bus (USB) memory stick, a memory card, and a read only memory (ROM), and may be provided.

Although embodiments have been shown and described, it will be appreciated by those skilled in the art that changes may be made to these embodiments without departing from the principles and spirit of the disclosure. Accordingly, the scope of the disclosure is not construed as being limited to the described embodiments, but is defined by the appended claims as well as equivalents thereto.

What is claimed is:

1. An electronic device comprising:
a memory;
a communication interface; and
a processor configured to:
based on a source device connected through the communication interface being identified to support a first version of content transmission encryption:
convert first Extended Display Identification Data (EDID) information, which is stored in the memory and corresponds to a second version of content transmission encryption, to second EDID information corresponding to the first version of content transmission encryption, and
change a hot plug detect signal related to the communication interface from a low state to a high state so that the source device recognizes that a High-Definition Multimedia Interface (HDMI) cable is connected and reads the second EDID information.

2. The electronic device as claimed in claim 1, wherein the processor is further configured to:
identify that the source device supports an HDMI version corresponding to the second EDID information,
wherein, the first EDID information includes a Vendor-Specific Data Block (VSDB), and
wherein the second EDID information includes the VSDB and an HDMI Forum VSDB (HF-VSDB).

3. The electronic device as claimed in claim 2, wherein the memory is a first memory accessible by the source device, and
wherein the processor is further configured to, based on the source device being identified to distinguish the VSDB and the HF-VSDB by supporting the HDMI version corresponding to the second EDID information, write the VSDB and the HF-VSDB to the first memory according to information stored in a second memory.

4. The electronic device as claimed in claim 2, wherein the memory is a first memory accessible by the source device, and
wherein the processor is further configured to, based on the source device being identified to distinguish the VSDB and the HF-VSDB by supporting the HDMI version corresponding to the second EDID information, additionally write the HF-VSDB to the first memory according to information stored in a second memory.

5. The electronic device as claimed in claim 2, wherein the VSDB is stored in a first area of the memory, and
wherein the processor is further configured to, based on the source device being identified to distinguish the VSDB and the HF-VSDB by supporting the HDMI version corresponding to the second EDID information, additionally write the HF-VSDB to the first area of the memory according to information stored in a second area of the memory.

6. The electronic device as claimed in claim 1, wherein the processor is further configured to identify that the source device supports the first version of content transmission encryption based on the source device being connected according to the first version of content transmission encryption.

7. The electronic device as claimed in claim 1, wherein the processor is further configured to, based on a communication connection attempt in accordance with the first version of content transmission encryption through the communication interface, identify that the source device supports the first version of content transmission encryption.

8. The electronic device as claimed in claim 1, wherein the processor is further configured to:
maintain the first EDID information stored in the memory while a predetermined menu is inactivated,
based on the source device being identified to support the first version of content transmission encryption, change the predetermined menu from an inactivation state to an activation state, and
based on the predetermined menu being changed to the activation state, convert the first EDID information stored in the memory to the second EDID information.

9. The electronic device as claimed in claim 1, wherein the communication interface is an HDMI port, and
wherein the processor is further configured to change a signal of a predetermined pin related to the hot plug detect signal among a plurality of pins included in the HDMI port from the low state to the high state.

10. The electronic device as claimed in claim 1, wherein the first version of content transmission encryption is High-bandwidth Digital Content Protection (HDCP) 2.2 version or higher.

11. A method for controlling an electronic device, the method comprising:
based on a source device connected through a communication interface being identified to support a first version of content transmission encryption:
converting first Extended Display Identification Data (EDID) information, which is stored in a memory and corresponds to a second version of content transmission encryption, to second EDID information corresponding to the first version of content transmission encryption; and
changing a hot plug detect signal related to the communication interface from a low state to a high state so that the source device recognizes that a High-Definition Multimedia Interface (HDMI) cable is connected and reads the second EDID information.

12. The method as claimed in claim 11, wherein the converting the first EDID information to the second EDID information further comprises:
identifying that the source device supports an HDMI version corresponding to the second EDID information,
wherein the first EDID information includes a Vendor-Specific Data Block (VSDB), and
wherein the second EDID information includes the VSDB and an HDMI Forum VSDB (HF-VSDB).

13. The method as claimed in claim 12, wherein the memory is a first memory accessible by the source device, and
wherein the converting the first EDID information to the second EDID information further comprises,
based on the source device being identified to distinguish the VSDB and the HF-VSDB by supporting the HDMI version corresponding to the second EDID information, writing the VSDB and the HF-VSDB to the first memory according to information stored in a second memory.

14. The method as claimed in claim 12, wherein the memory is a first memory accessible by the source device, and wherein the converting the first EDID information to the second EDID information further comprises, based on the source device being identified to distinguish the VSDB and the HF-VSDB by supporting the HDMI version corresponding to the second EDID information, additionally writing the HF-VSDB to the first memory according to information stored in a second memory.

15. The method as claimed in claim 11, further comprising:
identifying that the source device supports the first version of content transmission encryption based on the source device being connected according to the first version of content transmission encryption.

16. The method as claimed in claim 11, further comprising:
based on a communication connection attempt according to the first version of content transmission encryption through the communication interface, identifying that the source device supports the first version of content transmission encryption.

17. The method as claimed in claim 11, wherein the converting the first EDID information to the second EDID information further comprises,
maintaining the first EDID information stored in the memory while a predetermined menu is inactivated;
based on the source device being identified to support the first version of content transmission encryption, changing the predetermined menu from an inactivation state to an activation state; and
based on the predetermined menu being changed to the activation state, converting the first EDID information stored in the memory to the second EDID information.

18. The method as claimed in claim 11, wherein the communication interface is an HDMI port, and
wherein the changing the hot plug detect signal from the low state to the high state comprises changing a signal of a predetermined pin related to the hot plug detect signal among a plurality of pins included in the HDMI port, from the low state to the high state.

19. The method as claimed in claim 11, wherein the first version of content transmission encryption is a High-bandwidth Digital Content Protection (HDCP) 2.2 version or higher.

20. A non-transitory computer readable medium having stored thereon one or more instructions which, when executed by a processor of an electronic device, causes the electronic device to perform operations including:
based on a source device connected through a communication interface being identified to support a first version of content transmission encryption, converting first Extended Display Identification Data (EDID) information, which is stored in a memory and corresponds to a second version of content transmission encryption, to send EDID information corresponding to the first version of content transmission encryption; and
changing a hot plug detect signal related to the communication interface from a low state to a high state so that the source device recognizes that a High-Definition Multimedia Interface (HDMI) cable is connected and reads the second EDID information.

* * * * *